United States Patent
Yamamoto

(10) Patent No.: US 8,351,751 B2
(45) Date of Patent: Jan. 8, 2013

(54) OPTICAL WAVEGUIDE AND METHOD OF MANUFACTURING THE SAME, AND OPTICAL WAVEGUIDE MOUNTED BOARD

(75) Inventor: Takanori Yamamoto, Nagano (JP)

(73) Assignee: Shinko Electric Industries Co., Ltd., Nagano-shi (JP)

( * ) Notice: Subject to any disclaimer, the term of this patent is extended or adjusted under 35 U.S.C. 154(b) by 395 days.

(21) Appl. No.: 12/795,105

(22) Filed: Jun. 7, 2010

(65) Prior Publication Data

US 2010/0316343 A1 Dec. 16, 2010

(30) Foreign Application Priority Data

Jun. 12, 2009 (JP) ................... 2009-140899

(51) Int. Cl.
*G02B 6/00* (2006.01)
*G02B 6/10* (2006.01)
*B32B 37/02* (2006.01)
*B32B 37/18* (2006.01)

(52) U.S. Cl. ............... 385/129; 385/132; 156/275.5
(58) Field of Classification Search ............. 385/14, 385/47, 129–132; 156/275.5, 276
See application file for complete search history.

(56) References Cited

U.S. PATENT DOCUMENTS

| | | | | |
|---|---|---|---|---|
| 4,146,297 A * | 3/1979 | Alferness et al. | ........... | 385/41 |
| 5,155,620 A * | 10/1992 | Gordon et al. | ........... | 359/328 |
| 7,477,816 B2 * | 1/2009 | Juni | ........... | 385/33 |
| 7,796,851 B2 * | 9/2010 | Yonekura et al. | ........... | 385/47 |
| 7,865,052 B2 * | 1/2011 | Yonekura et al. | ........... | 385/129 |
| 2011/0007998 A1 * | 1/2011 | Yamamoto et al. | ........... | 385/14 |

FOREIGN PATENT DOCUMENTS

JP 2007-293244 A1 11/2007

\* cited by examiner

*Primary Examiner* — Akm Ullah
(74) *Attorney, Agent, or Firm* — Kratz, Quintos & Hanson, LLP

(57) ABSTRACT

A first clad layer is formed on a first substrate, and further first cores extending in parallel to each other in one direction are formed on the first clad layer. Separately from this, a second clad layer is formed on a second substrate, and further second cores extending in parallel to each other in a direction parallel to the first cores are formed on the second clad layer. Next, the first substrate and the second substrate are integrated with a third clad layer interposed therebetween in such a manner that a surface of the first substrate having the first cores formed thereon faces a surface of the second substrate having the second cores formed thereon, to thereby form an optical waveguide.

7 Claims, 9 Drawing Sheets

OPTICAL WAVEGUIDE AND METHOD OF MANUFACTURING THE SAME, AND OPTICAL WAVEGUIDE MOUNTED BOARD

CROSS-REFERENCE TO RELATED APPLICATION

This application is based on and claims priority of Japanese Patent Application No. 2009-140899 filed on Jun. 12, 2009, the entire contents of which are incorporated herein by reference.

BACKGROUND OF THE INVENTION (a) Field of the Invention

The present invention relates to an optical waveguide including multiple cores in a clad layer, a method of manufacturing the same, and an optical waveguide mounted board.

(b) Description of the Related Art

In recent years, optical waveguides capable of high speed data transfer have been used even in short-distance communications, such as ones within a wiring board and between wiring boards.

As a prior art optical waveguide, there is known an optical waveguide having a multi-layered arrangement in which multiple cores are stacked together (e.g., Japanese Patent Application Publication No. 2007-293244, hereinafter referred to as Patent Document 1). This optical waveguide having a multi-layered arrangement is manufactured as follows. First, a first clad layer and then a first core layer are formed on a substrate. Then, the first core layer is exposed to a pattern of light and developed to form multiple first layer cores. Next, a second clad layer is formed which covers the first layer cores and the first clad layer. After that, a second core layer is formed on the second clad layer. The second core layer is then exposed to a pattern of light and developed to form second layer cores. Further, a third clad layer is formed on the second layer cores and the second clad layer. Thereafter, the same steps are repeated to form an optical waveguide having a multi-layer structure.

However, in the prior art optical waveguides, it is always necessary to form a clad layer between different core layers in the process of stacking cores together. This is because cores protrude from a clad layer when the cores are formed on the clad layer, and therefore the cores and the clad layer need to be covered with a clad layer and planarized before the next core is formed. For this reason, the size of the optical waveguide in the thickness direction increases, resulting in a decrease in the wiring density of optical wiring.

On the other hand, there are needs for the following optical waveguides: an optical waveguide which includes optical wiring having cores with different core diameters, and providing different transfer speeds depending on the core diameters; and an optical waveguide in which mirrors are formed at different positions and angles on different cores to allow light receiving/emitting elements to be mounted on both sides of the optical waveguide. However, in the aforementioned prior art method of manufacturing an optical waveguide, it is impossible to form cores having different thicknesses in a single layer, or to form cores having mirrors formed at different positions and angles in a single layer. For this reason, in the prior art optical waveguides, in order to form cores having different core diameters or form cores each having mirrors formed at different positions and angles, multiple cores having different core diameters or different mirror positions need to be stacked in the thickness direction of the optical waveguides. This increases the sizes of the optical waveguides in the thickness direction.

SUMMARY OF THE INVENTION

An object of the present invention is to provide an optical waveguide capable of achieving a higher density of optical wiring by reducing an increase in size in a thickness direction thereof, a method of manufacturing the same, and an optical waveguide mounted board.

According to one aspect of the present invention, there is provided an optical waveguide including: a first clad layer having multiple first cores formed on one surface of the first clad layer, the first cores extending in one direction in parallel to each other; a second clad layer having multiple second cores formed on one surface of the second clad layer, the second cores extending in the one direction in parallel to each other; and a third clad layer formed to fill a gap between the one surface of the first clad layer having the first cores formed thereon and the one surface of the second clad layer having the second cores formed thereon.

According to another aspect of the present invention, there is provided a method of manufacturing an optical waveguide, including: forming a first clad layer on a first substrate and further forming on the first clad layer a plurality of first cores extending in one direction in parallel to each other; forming a second clad layer on a second substrate and further forming on the second clad layer a plurality of second cores extending in the one direction in parallel to each other; and bonding the first and second substrates with a third clad layer interposed therebetween in such a manner that a surface of the first substrate having the first cores formed thereon faces a surface of the second substrate having the second cores formed thereon.

According to the above-described aspects, there are separately prepared the first board having the first cores formed thereon and the second board having the second cores formed thereon, and the first and second boards are integrated with the third clad layer interposed therebetween such that surfaces on the sides where the first and second cores are respectively formed face each other. Since the first cores and the second cores can be arranged in the third clad layer, the size in the thickness direction can be reduced compared to that in the case in the aforementioned prior art where the first layer cores and the second layer cores are stacked together in the thickness direction with the clad layer interposed therebetween.

Accordingly, for example, even in the case where the first cores include mirrors having orientations and positions different from those of the second cores or where the core diameter of the first cores is different from that of the second cores, the first cores and the second cores can be arranged in the third clad layer. Therefore, an increase in the size of the optical waveguide in a thickness direction thereof can be reduced.

BRIEF DESCRIPTION OF THE DRAWINGS

FIG. 7A is a cross-sectional view showing a structure of a first board after mirror formation. FIG. 7B is also a cross-sectional view showing a structure of a second board after mirror formation.

DESCRIPTION OF THE PREFERRED EMBODIMENTS

Hereinafter, preferred embodiments of the present invention will be described with reference to the accompanying drawings.

First Embodiment

Figure 1:
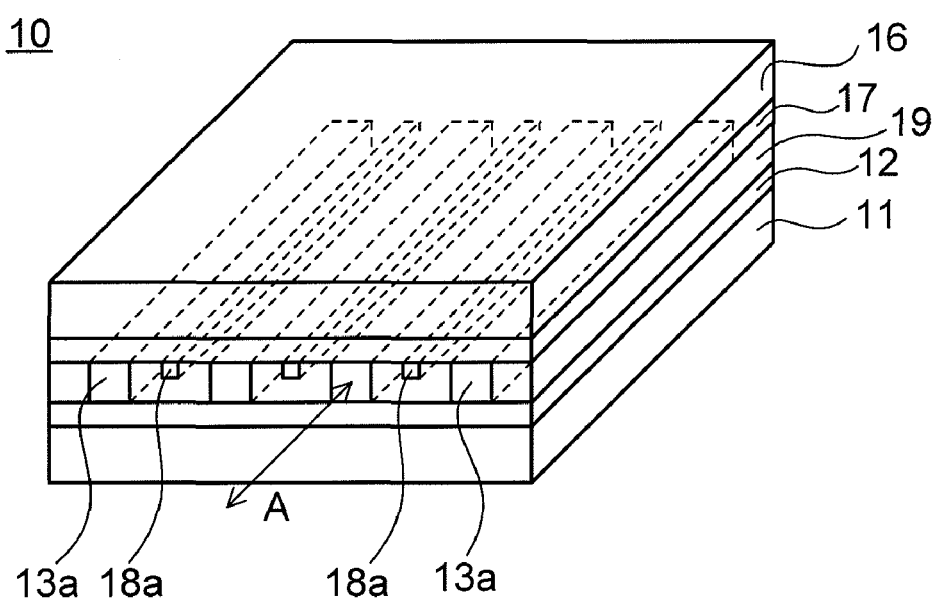
FIG. 1 is a perspective view showing a structure of an optical waveguide according to a first embodiment.

FIG. 1 is a perspective view showing the structure of an optical waveguide according to a first embodiment.

An optical waveguide 10 according to the first embodiment is in the form of a flat plate or a sheet. As shown in the drawing, the optical waveguide 10 includes, in order from the bottom, a first substrate 11, a first clad layer 12, first cores 13a, a third clad layer 19, second cores 18a, a second clad layer 17, and a second substrate 16.

The first cores 13a are formed on the first clad layer 12, and extend in a direction indicated by arrow A in parallel to each other. Meanwhile, the second cores 18a are formed on the second clad layer 17, arranged in spaces between the first cores 13a, and extend in the direction indicated by the arrow A in parallel to each other. In the present embodiment, the core diameter of the second cores 18a (core thickness and core width) is selected to be smaller than that of the first cores 13a. If the core diameter of the second cores 18a is set to, for example, approximately 35 μm or smaller according to such selection, an optical propagation mode inside the cores can be a single mode, and then the transfer speed can be increased; therefore, it is preferable.

It should be noted that, although, in this embodiment, the case where there are different core diameters is taken as an example, the present invention is not necessarily limited to this. The core diameters of the first cores 13a and the second cores 18a may be equal to each other.

The third clad layer 19 is formed to fill spaces between the first clad layer 12 and the second clad layer 17 and also to fill spaces around the first cores 13a and the second cores 18a. With the third clad layer 19 in such a configuration, the first clad layer 12 and the second clad layer 17 are mechanically bonded together.

The optical waveguide 10 according to this embodiment is intended to be used as connected with a light receiving/emitting element, an optical connector or the like to end faces where the first cores 13a and the second cores 18a are exposed. Connecting such a light receiving/emitting element or the like allows optical signals to be inputted and outputted through the end faces as indicated by the arrow A in the drawing.

As described above, in the optical waveguide 10 according to this embodiment, the first cores 13a and the second cores 18a having different core diameters are formed in the third clad layer 19. Accordingly, optical signals having different transfer speeds can be propagated at the same time. Further, unlike the case in Patent Document 1 where cores having different core diameters are stacked together in the height direction with a clad layer interposed therebetween, the first cores 13a and the second cores 18a having different core diameters are formed in a single third clad layer 19. Accordingly, an increase in size in the thickness direction can be reduced. Moreover, even in the case where the first and second cores 13a and 18a have the same core diameter, an increase in size in the thickness direction can be reduced compared to the case where cores are stacked together in the thickness direction with a clad layer interposed therebetween as heretofore. As described above, according to this embodiment, it is possible to reduce an increase in the size of the optical waveguide in the thickness direction thereof and to increase the wiring density of optical wiring.

FIGS. 2A to 3B are cross-sectional views showing in a process sequence, a method of manufacturing the optical waveguide according to the first embodiment. Hereinafter, the method of manufacturing the optical waveguide 10 according to the first embodiment will be described with reference to FIGS. 2A to 3B.

Figure 2A:
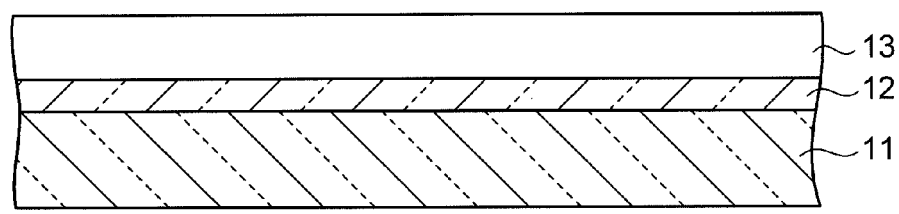
FIGS. 2A to 2D are cross-sectional views (part 1) showing in a process sequence, method of manufacturing the optical waveguide according to the first embodiment.

First, as shown in FIG. 2A, the first substrate 11 in the form of a sheet or a plate is prepared which is made of transparent resin, such as a polycarbonate resin or an acrylic resin. For the first substrate 11, any material which transmits ultraviolet light can be used besides the polycarbonate resin. Subsequently, on the first substrate 11, an uncured resin film is laminated which is made of an ultraviolet (UV) curable resin, such as an epoxy resin and a polyimide resin, and is then cured by UV irradiation. Thus, the first clad layer 12 is formed. The thickness of the first clad layer 12 may be, for example, approximately 50 μm. Then, a core layer 13 in the form of a film is laminated on the first clad layer 12. The core layer 13 is also made of an epoxy-based ultraviolet curable resin (uncured). Here, the thickness of the core layer 13 is set to approximately 80 μm. It should be noted that the same material as that of the clad layer 12 can basically be used as a material for the core layer 13. However, to make the refractive index of the core layer 13 higher than that of the first clad layer 12, some appropriate additives are added as necessary.

Figure 2B:
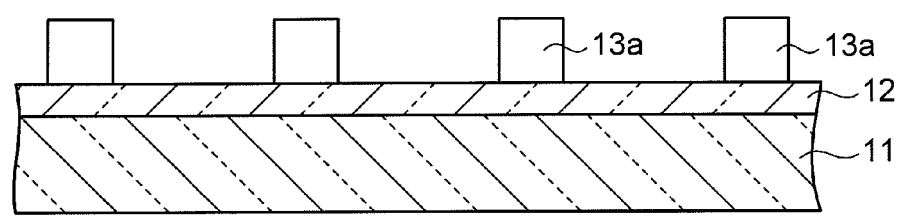

Next, as shown in FIG. 2B, the core layer 13 is exposed and developed by a photolithography technique. Thus, the multiple first cores 13a having rectangular (for example, square) cross sections are formed on the first clad layer 12. The thickness (also referred to as height) of the first cores 13a may be, for example, approximately 80 μm, and the width of the first cores 13a may be, for example, approximately 80 μm.

Further, the first cores 13a are arranged in a width direction thereof at a pitch of, for example, approximately 250 µm.

Figure 2C:
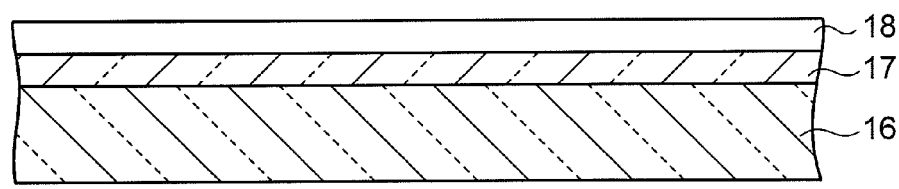

Next, as shown in FIG. 2C, the second substrate 16 is prepared. On the second substrate 16, an uncured ultraviolet-curable resin film is laminated and cured. Thus, the second clad layer 17 is formed. The material and the thickness of the second substrate 16 may be similar to those of the first substrate 11, and the material and the thickness of the second clad layer 17 may be similar to those of the first clad layer 12.

After that, a core layer 18 in the form of a film is laminated on the second clad layer 17. The composition of the core layer 18 is similar to that of the above-described core layer 13, while the thickness of the core layer 18 may be approximately 35 µm.

Figure 2D:
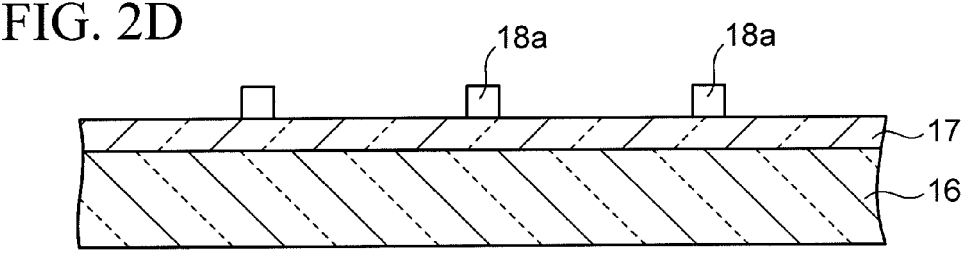

Next, as shown in FIG. 2D, the core layer 18 is exposed and developed by a photolithography technique. Thus, the multiple second cores 18a are formed on the second clad layer 17. The height (thickness) of the second cores 18a may be, for example, approximately 35 µm, and the width of the second cores 18a may be, for example, approximately 35 µm. Further, the second cores 18a are placed in a width direction thereof at a pitch of, for example, approximately 250 µm. It should be noted that the steps shown in FIGS. 2C and 2D may be performed before, simultaneously and also after the steps shown in FIGS. 2A and 2B.

Figure 3A:
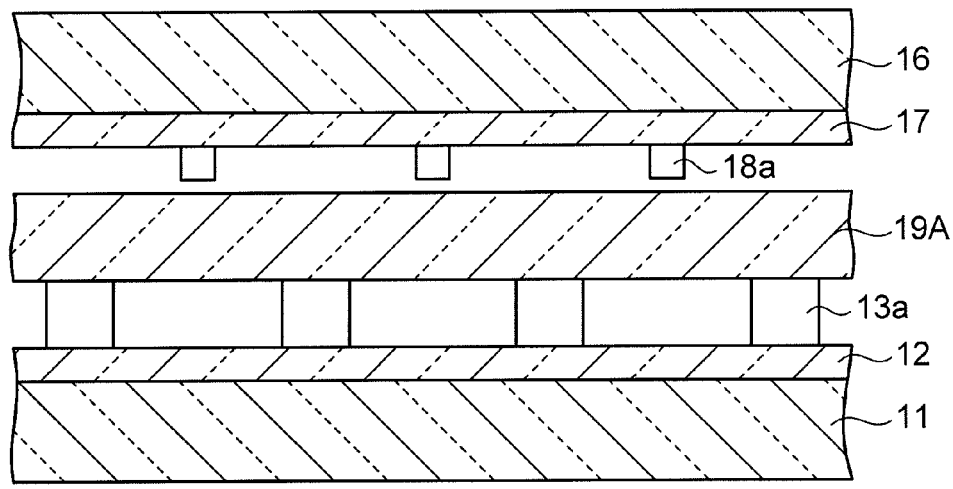
FIGS. 3A and 3B are cross-sectional views (part 2) showing in the process sequence, the method of manufacturing the optical waveguide according to the first embodiment.

Next, as shown in FIG. 3A, a resin layer 19A to serve as the third clad layer 19 is arranged on a surface of the first substrate 11 on the side thereof where the first cores 13a are formed. The resin layer 19A is in the form of a film, and made of an uncured ultraviolet curable resin. The composition of the resin layer 19A may be similar to those of the first clad layer 12 and the second clad layer 17. The thickness of the resin layer 19A is set equivalent to or larger than the thickness of the thicker one between the first cores 13a and the second cores 18a. Here, the thickness of the resin layer 19A may be approximately 90 µm. It should be noted that the resin layer 19A may be formed by coating a liquid ultraviolet curable resin onto the first clad layer 12 and the first cores 13a.

Subsequently, on the resin layer 19A arranged on the first clad layer 12, the second substrate 16 is arranged such that a surface thereof on the side where the second cores 18a are formed faces down. At this time, the second substrate 16 is positioned such that the second cores 18a are located at respective positions shifted from those of the first cores 13a in the width direction. Here, each of the second cores 18a is placed midway between two adjacent first cores 13a. It should be noted that the present embodiment is not limited to this, and the second core 18a may be located closer to any one of the two first cores 13a within a range in which at least interference between optical signals does not occur (for example, at a distance of approximately 50 µm or more).

Figure 3B:
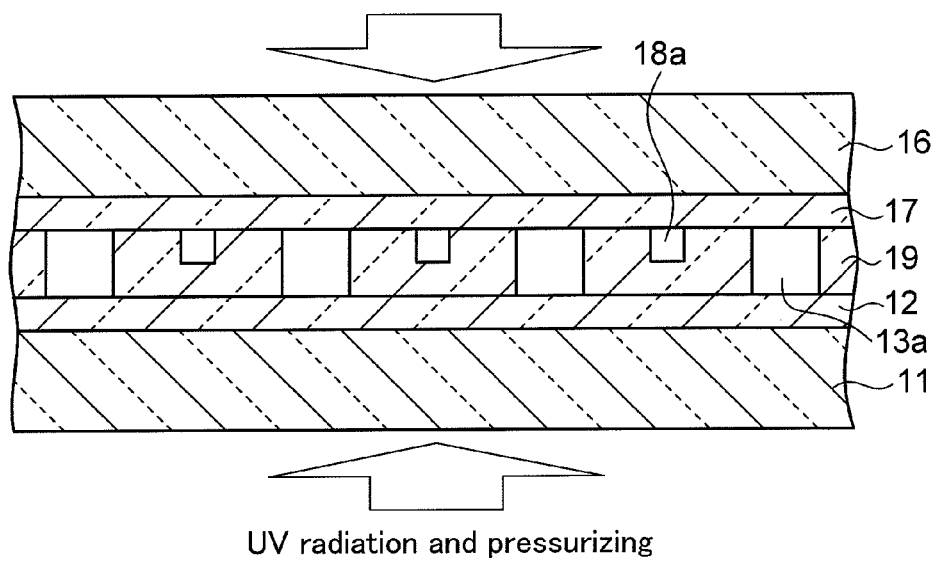

Next, as shown in FIG. 3B, the first substrate 11 and the second substrate 16, which are aligned with each other with the resin layer 19A interposed therebetween, are placed between a pair of press heating platens (not shown in the drawing), and pressure is applied from above and below as indicated by arrows in the drawing. Thus, the two boards are integrated. This step is performed in a vacuum with the resin layer 19A heated to, for example, approximately 120° C. This ensures that filling properties (viscosity) of the resin layer 19A fall within an appropriate range. Therefore, it is possible to hermetically fill spaces between the first clad layer 12 and the second clad layer 17 with the resin layer 19A while the mixing in of bubbles is prevented.

Subsequently, the resin layer 19A is irradiated with ultraviolet light through at least one side of the first substrate 11 and the second substrate 16 so as to be cured. Thus, the third clad layer 19 is formed. After that, end faces of the first and second cores 13a and 18a are exposed and planarized. Thus, the optical waveguide 10 shown in FIG. 1 is completed.

As described above, in the optical waveguide 10 according to the first embodiment, unlike in the case in Patent Document 1 where cores having different core diameters are stacked in the height direction thereof with a clad layer interposed therebetween, the first cores 13a and the second cores 18a having different core diameters are formed in a single third clad layer 19. Therefore, an increase in size in the thickness direction can be reduced. Moreover, even in the case where the first and second cores 13a and 18a have the same core diameter, an increase in size in the thickness direction can be reduced compared to the case where cores are stacked with a clad layer interposed therebetween. As described above, according to the present embodiment, it is possible to reduce an increase in the size of the optical waveguide in the thickness direction thereof, and to increase the wiring density of optical wiring.

It should be noted that, although a description in the present embodiment has been made by taking as an example the case where the third clad layer 19 (resin layer 19A) is formed using an ultraviolet curable resin, a material to be thus used is not limited to this, and a thermosetting resin may be used. In such a case, the third clad layer 19 can be formed by heating the resin layer 19A through the first substrate 11 and the second substrate 16, when the first substrate 11 and the second substrate 16 are integrated. In this case, it is preferable to select the thermosetting resin constituting the third clad layer 19 such that the thermal expansion coefficient and refractive index thereof are respectively close to those of the first clad layer 12 and the second clad layer 17, since adhesion and optical properties can be obtained which are equivalent to those in the case where an ultraviolet curable resin is used.

Figure 4:
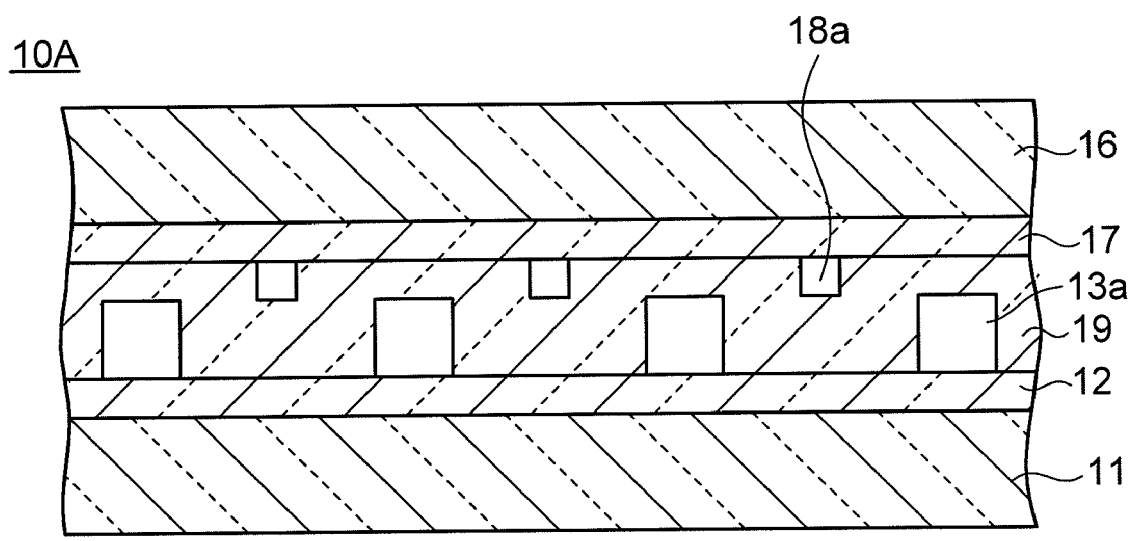
FIG. 4 is a cross-sectional view showing a structure of an optical waveguide according to a modified example of the first embodiment.

Moreover, in the example shown in FIGS. 1 and 3B, the upper end of each of the first cores 13a are in contact with the second clad layer 17. However, the present embodiment is not limited to this. For example, as shown in FIG. 4, the upper end of each of the first cores 13a may not be in contact with the second clad layer 17.

Second Embodiment

Figure 5A:
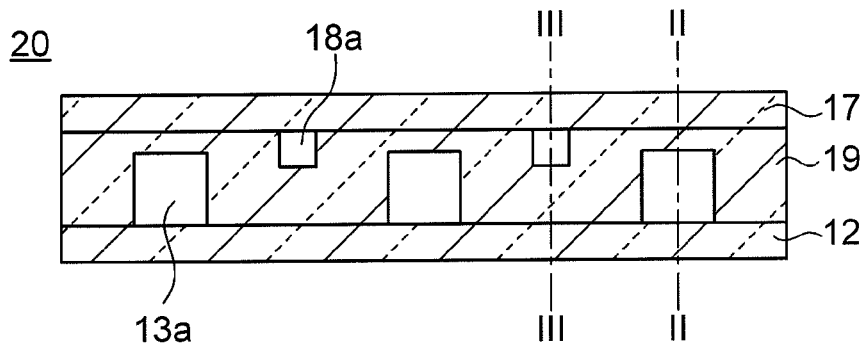
FIGS. 5A to 5C are cross-sectional views showing a structure of an optical waveguide according to a second embodiment.
Figure 5B:
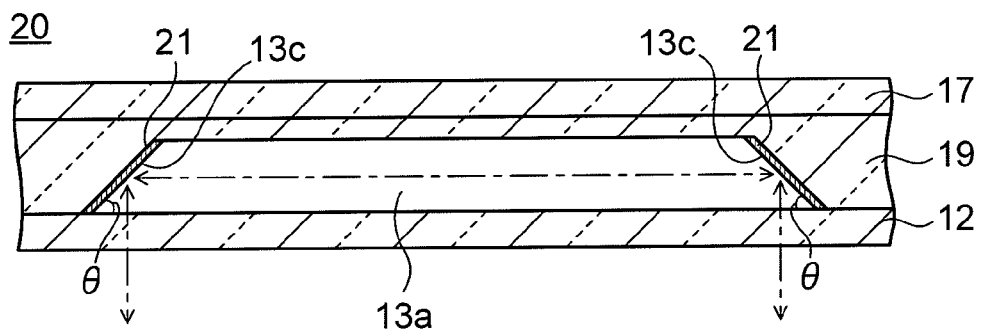
Figure 5C:
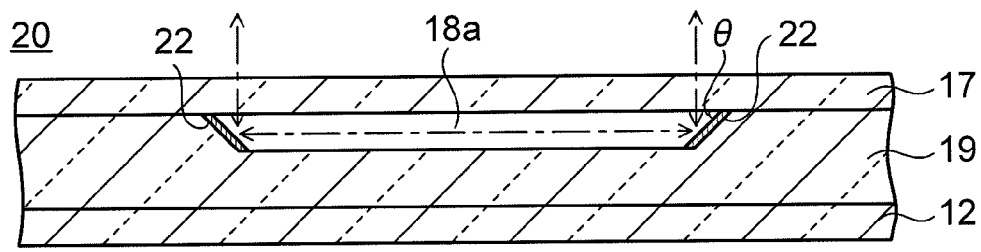

FIGS. 5A to 5C are cross-sectional views showing the structure of an optical waveguide according to a second embodiment. Note that FIG. 5B shows the structure of a vertical cross section taken along a line II-II of FIG. 5A, and FIG. 5C shows the structure of a vertical cross section taken along a line of FIG. 5A.

Unlike the optical waveguide 10 according to the first embodiment in which optical signals are inputted and outputted from the end faces of the cores, an optical waveguide 20 according to the present embodiment has a configuration in which optical signals are inputted and outputted from both the upper and lower surfaces of the optical waveguide 20. Specifically, as shown in FIG. 5B, each of the first cores 13a has at two opposite ends thereof a slant face 13c which is inclined at $\theta=45°$ with respect to the first clad layer 12. On each of the slant faces 13c, a mirror 21 is formed. The mirrors 21 each reflect, at an angle of 90 degrees, light which has entered from the first clad layer 12 side and light which has propagated through the first core 13a. Accordingly, the first core 13a allows optical signals to be inputted to and outputted from the first clad layer 12 side.

Moreover, as shown in FIG. 5C, each of the second cores 18a has at two opposite ends thereof a slant face 18c which is inclined at $\theta=45°$ with respect to the second clad layer 17. On each of the slant faces 18c, a mirror 22 is formed. The mirrors 22 each reflect, at an angle of 90 degrees, light which has entered from the second clad layer 17 side and light which has propagated through the second core 18a. Accordingly, the second core 18a allows optical signals to be inputted to and outputted from the second clad layer 17 side.

It should be noted that the optical waveguide 20 according to the present embodiment does not need the first substrate 11 and the second substrate 16. Accordingly, these boards 11 and 16 are detached and removed from the optical waveguide 20. Other components are basically the same as those of the optical waveguide 10 according to the first embodiment.

As described above, the optical waveguide 20 according to the present embodiment includes a light receiving/emitting element (for example, VCSEL) mounted on both the upper and lower surfaces thereof, thereby can transfer optical signals. In this case, the first cores 13a and the second cores 18a are as well formed in the same third clad layer 19. Accordingly, as in the aforementioned first embodiment, it is possible to reduce an increase in the size of the optical waveguide 20 in a thickness direction thereof, and to increase the wiring density of optical wiring.

FIGS. 6 to 8B are views showing in a process sequence, a method of manufacturing the optical waveguide 20 according to the second embodiment. Hereinafter, the method of manufacturing the optical waveguide 20 according to the second embodiment will be described with reference to FIGS. 6 to 8B.

First, as in the processing performed in the aforementioned steps of FIGS. 2A and 2B, the first clad layer 12 and the first cores 13a are formed in order on the first substrate 11.

Figure 6:
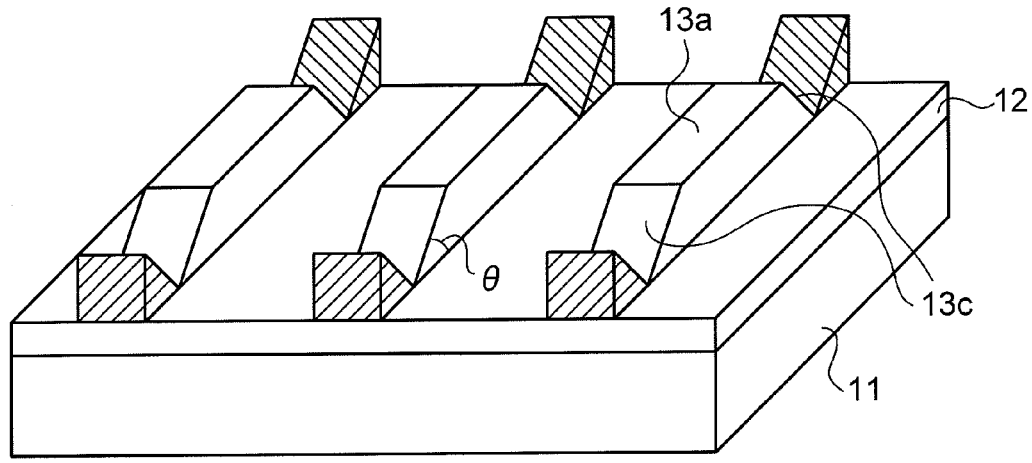
FIG. 6 is a perspective view showing a structure immediately after slant faces are formed in first cores by cutting with a dicing saw in a method of manufacturing the optical waveguide according to the second embodiment.

Next, as shown in FIG. 6, each of the first cores 13a is cut with a dicing saw so as to form a slant face 13c at two opposite ends of each of the first cores 13a. The inclination angle θ (angles with respect to the board plane) of the slant faces 13c is set to 45°. It should be noted that shaded portions in FIG. 6 do not cause particular problems even if they are left, but are removed here.

Figure 7A:
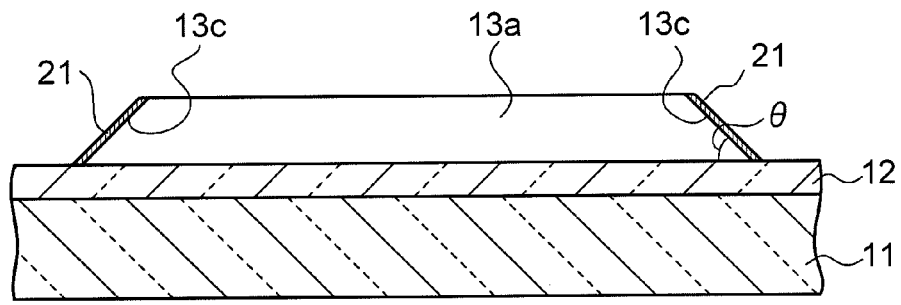
FIGS. 7A and 7B show a method of manufacturing the optical waveguide according to the second embodiment.

After that, a mask (not shown in the drawing) is formed through which only the slant faces 13c are exposed, and a metal film made of, for example, gold (Au), silver (Ag), or the like is formed by sputtering or the like. Thus, the mirror 21 is formed on each of the slant faces 13c. After that, the mask is removed. By the above-described steps, the structure shown in FIG. 7A is completed.

Figure 7B:
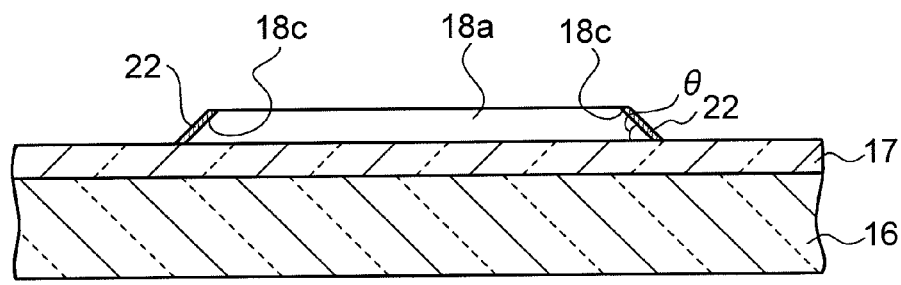

Next, as shown in FIG. 7B, the second clad layer 17 and the second cores 18a having the mirrors 22 are formed. It should be noted that steps for forming the structure shown in FIG. 7B can be performed as in the above-described steps described with reference to FIGS. 6 and 7A.

Figure 8A:
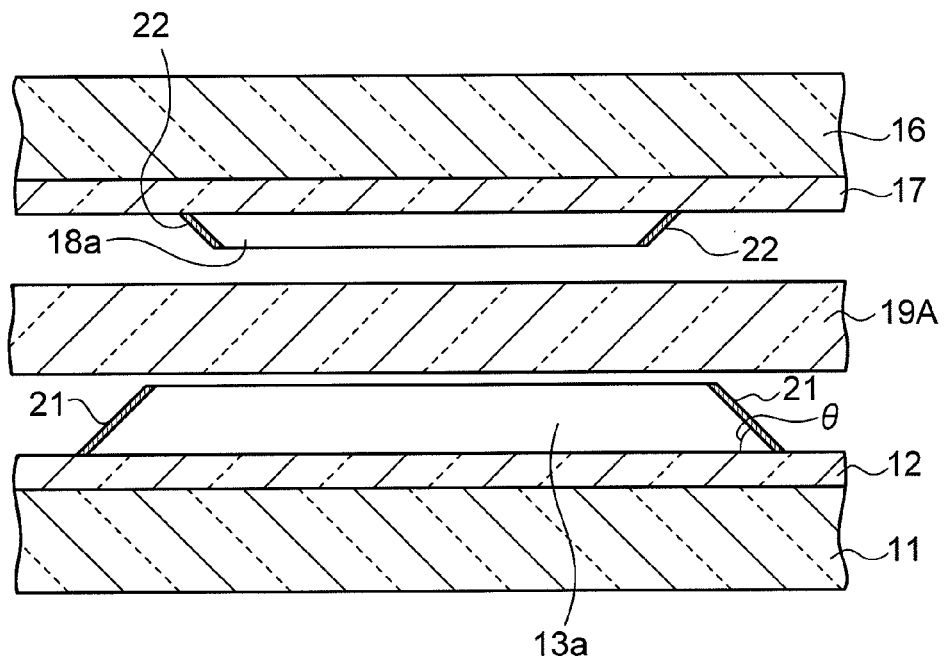
FIGS. 8A and 8B are cross-sectional views showing steps in order for bonding the first and second boards in the method of manufacturing the optical waveguide according to the second embodiment.

Next, as shown in FIG. 8A, the resin layer 19A made of an uncured ultraviolet curable resin is arranged on the first substrate 11. Further, the first substrate 11 and the second substrate 16 are arranged with the third clad layer 19 interposed therebetween such that the surface on the side having the first cores 13a formed thereon faces the surface on the side having the second cores 18a formed thereof. At this time, the second substrate 16 is positioned such that the positions of the mirrors 22 relative to the mirrors 21 are desired positions.

Figure 8B:
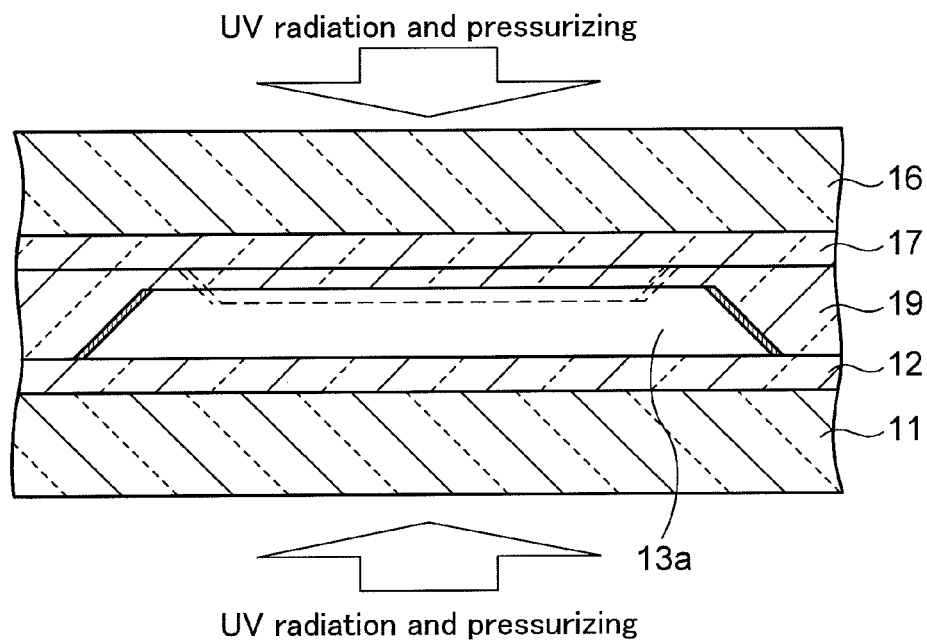

Next, as shown in FIG. 8B, the first substrate 11 and the second substrate 16 aligned with each other with the resin layer 19A interposed therebetween are placed between a pair of press heating platens (not shown in the drawing), and pressure is applied from above and below as indicated by arrows in the drawing. Thus, the two boards are integrated. Further, the resin layer 19A is irradiated with ultraviolet light through at least one of the first substrate 11 and the second substrate 16 to be cured. Thus, the third clad layer 19 is formed.

After that, the first substrate 11 is detached from the first clad layer 12, and further the second substrate 16 is detached from the second clad layer 17. It should be noted that the first and second boards 11 and 16 are made of materials different from those of the first and second clad layers 12 and 17, respectively, and can therefore be easily thus detached. By the above-described steps, the optical waveguide 20 shown in FIGS. 5A to 5C is completed.

As described above, in the present embodiment, the first cores 13a each having the mirrors 21 and the second cores 18a each having the mirrors 22 are formed independently from each other. After that, the optical waveguide 20 is fabricated by bonding the first clad layer 12 and the second clad layer 17 with the third clad layer 19 interposed therebetween such that the surface having the first cores 13a formed thereon faces the surface having the second cores 18a formed thereon. Accordingly, even in the case where the positions and angles of the mirrors 21 of the first cores 13a are different from those of the mirrors 22 of the second cores 18a, the first cores 13a and the second cores 18a can be formed in a single third clad layer 19. Thus, as in the aforementioned case in the first embodiment, it is possible to reduce an increase in size in the thickness direction and to increase wiring density. Moreover, in the optical waveguide 20 according to the present embodiment, a light receiving/emitting element can be mounted on both the upper and lower surfaces of the optical waveguide 20. Accordingly, packaging density can be increased.

Third Embodiment

Figure 9A:
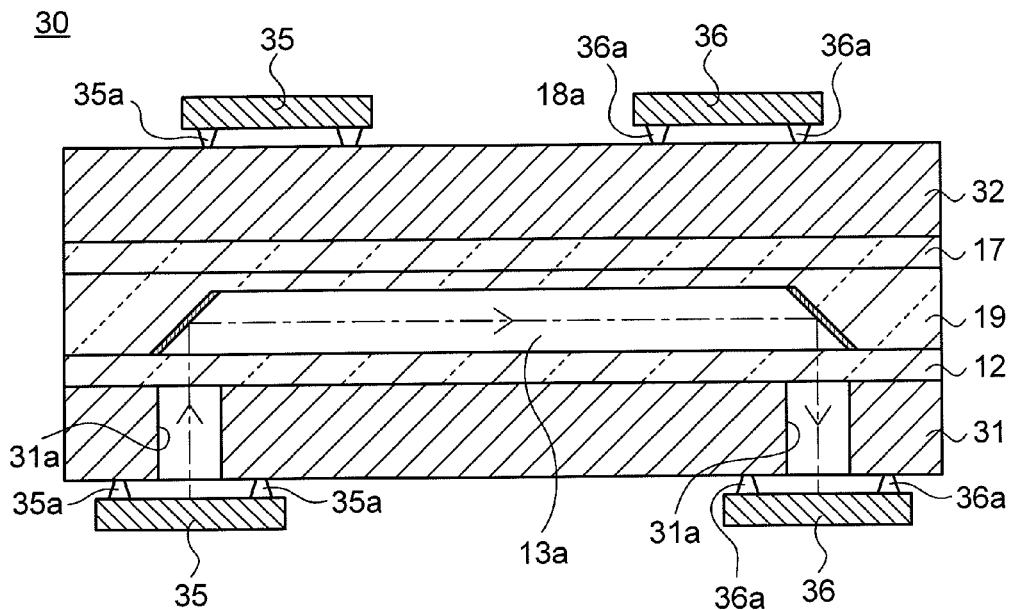
FIG. 9A is a cross-sectional view of an optical waveguide mounted board according to a third embodiment which is cut along a plane including first cores.
Figure 9B:
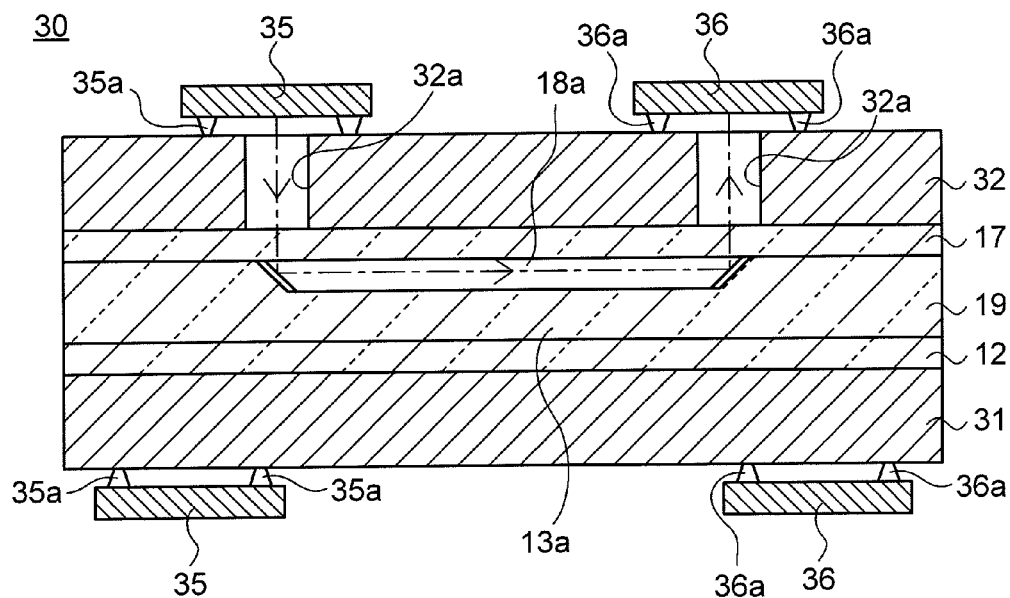
FIG. 9B is a cross-sectional view of the optical waveguide mounted board according to the third embodiment which is cut along a plane including second cores.

FIGS. 9A and 9B are views showing an optical waveguide mounted board according to a third embodiment. An optical waveguide mounted board 30 according to the third embodiment is obtained by mounting a first wiring board 31 and a second wiring board 32 on both sides of the optical waveguide 20 of the second embodiment, respectively. It should be noted that FIG. 9A is a cross-sectional view of the optical waveguide mounted board 30 cut in a plane including the first cores 13a, and FIG. 9B is a cross-sectional view of the optical waveguide mounted board 30 cut in a plane including the second cores 18a.

As shown in FIG. 9A, the first wiring board 31 is attached to the first clad layer 12 of the optical waveguide 20, and has an aperture 31a at a position where the mirror 21 is formed on the first core 13a. Underneath the mirror 21 on one side of the first core 13a, a light emitting element 35, such as a VCSEL, is arranged. Meanwhile, underneath the mirror 21 on the other side of the first core 13a, a light receiving element 36, such as a photodiode, is arranged.

As shown in FIG. 9B, the second wiring board 32 is attached to the second clad layer 17 of the optical waveguide 20, and has an aperture 32a at a position where the mirror 22 on the second core 18a is formed. Above the mirror 22 on one side of the second core 18a, a light emitting element 35 is arranged. Meanwhile, above the mirror 22 on the other side of the second core 18a, a light receiving element 36 is arranged. It should be noted that the first wiring board 31 and the second wiring board 32 are each electrically connected to the light emitting element 35 and the light receiving element 36 via a bump 35a and a bump 36a, respectively.

In the optical waveguide mounted board 30 according to this embodiment, light from the light emitting element 35 mounted on the side of the first wiring board 31 enters perpendicularly to the first clad layer 12 through the aperture 31a, and is reflected by the mirror 21 on one side of the first core 13a at an angle of 90 degrees. Then, the light propagates through the first core 13a, is reflected by the mirror 21 on the other side of the first core 13a at an angle of 90 degrees, and reaches the light receiving element 36 through the aperture 31a. On the other hand, light from the light emitting element 35 mounted on the second wiring board 32 enters perpendicularly to the second clad layer 17 through the aperture 32a, and is reflected by the mirror 22 on one side of the second core 18a at an angle of 90 degrees. Then, the light propagates through the second core 18a, is reflected by the mirror 22 on the other side of the second core 18a at an angle of 90 degrees, and reaches the light receiving element 36 through the apertures 32a.

The above-described optical waveguide mounted board 30 according to the third embodiment can be fabricated, for example, as follows.

First, the first wiring board 31 and the second wiring board 32 are formed by a build-up process or the like. Then, the aperture 31a is formed in the first wiring board 31, and the aperture 32a is also formed in second board 32. It should be noted that the apertures 31a and 32a can be formed by drilling using a drill, an excimer laser, or the like.

Next, the optical waveguide 20 is prepared which has been fabricated by the steps described in the second embodiment with reference to FIGS. 5A to 8B. Then, the first clad layer 12 of the optical waveguide 20 and the first wiring board 31 are aligned so as to match the positions of the aperture 31a and the mirror 21, and then are bonded together using an adhesive agent. Further, the second clad layer 17 of the optical waveguide 20 and the second wiring board 32 are aligned so as to match the positions of the aperture 32a and the mirror 22, and then are bonded together using an adhesive agent.

After that, the light emitting element 35 and the light receiving element 36 are mounted on both the first wiring board 31 and the second wiring board 32. Thus, the optical waveguide mounted board 30 is completed.

As described above, in the optical waveguide mounted board 30 according to the third embodiment, the wiring boards 31 and 32 each having the light receiving/emitting elements 35 and 36 mounted thereon can be mounted on both the lower and upper surfaces of the optical waveguide 20, respectively. Accordingly, a mounting density can be made higher than that in the past. Moreover, in the optical waveguide 20, the first cores 13a, which each allow optical signals between the light receiving/emitting elements 35 and 36 on the first wiring board 31 side to propagate, and the second cores 18a, which each allow optical signals between the light receiving/emitting elements 35 and 36 on the second wiring board 32 side to propagate, are formed in the third clad layer 19. Accordingly, as described in the first and second embodiments, the optical waveguide 20 makes it possible to reduce an increase in size in the thickness direction thereof, and therefore makes it possible to reduce an increase in the thickness of the optical waveguide mounted board 30 including the optical waveguide 20.

Modified Example of Third Embodiment

Figure 10A:
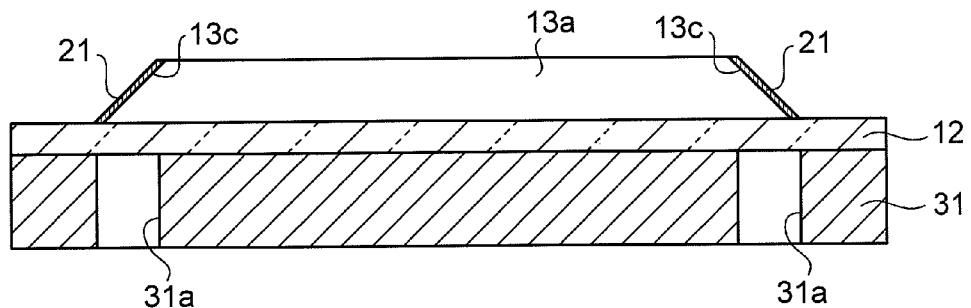
FIGS. 10A to 10C are cross-sectional views showing in a process sequence, a method of manufacturing an optical waveguide mounted board according to a modified example of the third embodiment.
Figure 10B:
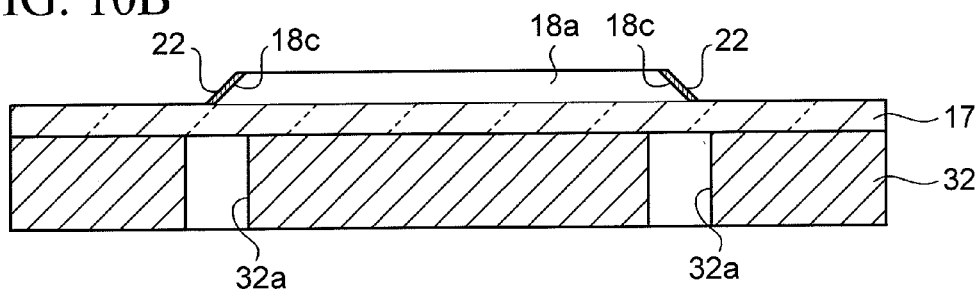
Figure 10C:
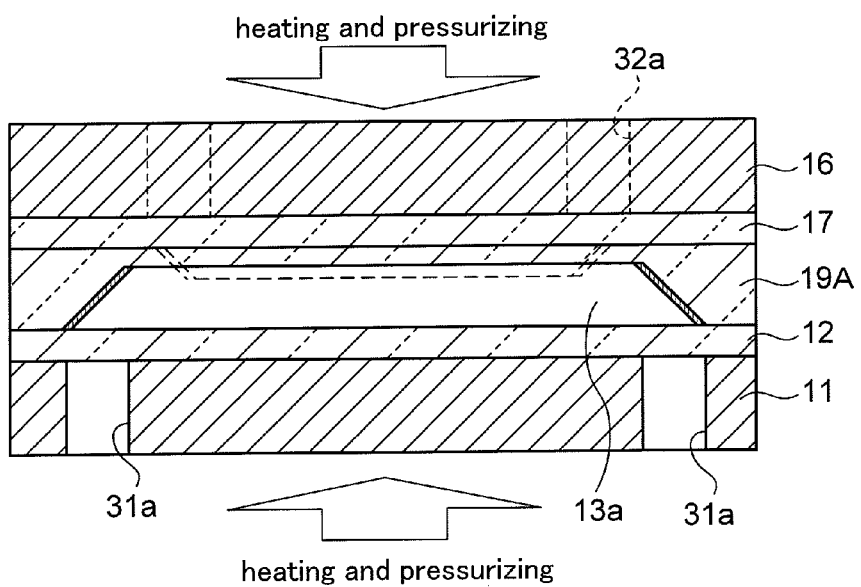

FIGS. 10A to 10C are cross-sectional views showing in a process sequence, a method of manufacturing an optical waveguide mounted board according to a modified example of the third embodiment. In the modified example of the third embodiment, a description will be made of an example in which the optical waveguide 20 is formed between the first wiring board 31 and the second wiring board 32 which do not transmit ultraviolet light, using a thermosetting resin as the third clad layer 19.

First, as shown in FIG. 10A, the first wiring board 31 is fabricated by a build-up process or the like, and the apertures 31a are formed at respective predetermined positions in the first wiring board 31. The apertures 31a can be formed by a hole drilling process using a drill, an excimer laser, or the like. After that, the first clad layer 12 and the first cores 13a are formed on the first wiring board 31. It should be noted that the first clad layer 12 and the first cores 13a can be formed by a technique such as the one used in the steps described with reference to FIGS. 2A and 2B.

Subsequently, the first cores 13a are each cut with a dicing saw to form the slant faces 13c having angles of $\theta=45°$ at each of two opposite ends of each of the first cores 13a. Then, a metal film made of gold (Au) or the like is formed on each of the slant faces 13c. Thus, the mirrors 21 are formed.

Moreover, the second wiring board 32 having the apertures 32a as shown in FIG. 10B is fabricated in steps similar to the above-described ones. The second clad layer 17 and the second core 18a having the mirrors 22 are formed on the second wiring board 32.

Next, as shown in FIG. 10C, the second wiring board 32 is arranged above the first wiring board 31 with the resin layer 19A interposed therebetween such that the surface on the side where the first core 13a is formed faces down. Further, while pressure is applied to the first and second wiring boards 31 and 32 from above and below to integrate the two boards, the resin layer 19A is cured by heating through the first and second wiring boards 31 and 32, and thereby the third clad layer 19 is formed.

By the above-described steps, the optical waveguide 20 is formed between the first wiring board 31 and the second wiring board 32. Thus, the optical waveguide mounted board 30 according to the third embodiment is completed.

As described above, the present modified example also has effects similar to those of the aforementioned third embodiment.

What is claimed is:

1. An optical waveguide comprising:
   a first clad layer having a plurality of first cores formed on one surface of the first clad layer, the first cores extending in one direction in parallel to each other;
   a second clad layer having a plurality of second cores formed on one surface of the second clad layer, the second cores extending in the one direction in parallel to each other; and
   a third clad layer formed to fill a gap between the one surface of the first clad layer having the first cores formed thereon and the one surface of the second clad layer having the second cores formed thereon.

2. The optical waveguide according to claim 1, further comprising mirrors formed respectively at two opposite ends of each of the first and second cores, the mirrors each configured to turn an optical path of light at 90 degrees, the light entering from a corresponding one of the first and second clad layers.

3. The optical waveguide according to claim 1, wherein the first cores have a core diameter different from a core diameter of the second cores.

4. A method of manufacturing an optical waveguide, comprising:
   forming a first clad layer on a first substrate and further forming on the first clad layer a plurality of first cores extending in one direction in parallel to each other;

forming a second clad layer on a second substrate and further forming on the second clad layer a plurality of second cores extending in the one direction in parallel to each other; and bonding the first and second substrates with a third clad layer interposed therebetween in such a manner that a surface of the first substrate having the first cores formed thereon faces a surface of the second substrate having the second cores formed thereon.

5. The method according to claim 4, wherein the third clad layer is made of an ultraviolet curable resin, the first substrate and the second substrate are made of a transparent resin, and the third clad layer is formed by irradiating the ultraviolet curable resin with an ultraviolet light through at least one of the first and second substrates.

6. The method according to claim 4, wherein the third clad layer is made of a thermosetting resin, and
   is formed by heating the thermosetting resin through at least one of the first and second substrates.

7. An optical waveguide mounted board comprising:
   a first clad layer having a plurality of first cores formed on one surface of the first clad layer, the first cores extending in one direction in parallel to each other;
   a second clad layer having a plurality of second cores formed on one surface of the second clad layer, the second cores extending in the one direction in parallel to each other;
   a third clad layer formed to fill a gap between the one surface of the first clad layer having the first cores formed thereon and the one surface of the second clad layer having the second cores formed thereon;
   mirrors formed respectively at two opposite ends of each of the first and second cores, the mirrors each configured to turn an optical path of light at 90 degrees, the light entering from a corresponding one of the first and second clad layers;
   a first wiring board arranged on the first clad layer, and having apertures at positions of the mirrors formed on the first core; and
   a second wiring board arranged on the second clad layer, and having apertures at positions of the mirrors formed on the second core.

* * * * *